United States Patent
Mitsumoto et al.

(10) Patent No.: US 6,788,247 B2
(45) Date of Patent: Sep. 7, 2004

(54) DISTANCE/VELOCITY MEASURING METHOD AND RADAR SIGNAL PROCESSING DEVICE

(75) Inventors: Masashi Mitsumoto, Tokyo (JP); Takamitsu Okada, Tokyo (JP); Takahiko Fujisaka, Tokyo (JP); Yoshio Kosuge, Tokyo (JP); Koichi Kai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/258,279

(22) PCT Filed: Feb. 21, 2001

(86) PCT No.: PCT/JP01/01364

§ 371 (c)(1),
(2), (4) Date: Oct. 23, 2002

(87) PCT Pub. No.: WO02/067010

PCT Pub. Date: Aug. 29, 2002

(65) Prior Publication Data

US 2003/0142009 A1 Jul. 31, 2003

(51) Int. Cl.[7] .......................... G01S 13/34; G01S 13/93
(52) U.S. Cl. ...................... 342/109; 342/70; 342/128
(58) Field of Search .................... 342/104, 109, 342/118, 128, 145, 70, 111

(56) References Cited

U.S. PATENT DOCUMENTS 5,905,458 A 5/1999 Ashihara
5,963,162 A 10/1999 Mochizuki et al.
6,018,309 A 1/2000 Mitsumoto et al.
6,317,073 B1 * 11/2001 Tamatsu et al. ............. 342/109
6,384,769 B1 5/2002 Mitsumoto et al.
6,611,225 B2 * 8/2003 Mitsumoto et al. ........... 342/70

FOREIGN PATENT DOCUMENTS

| JP | 5-142337 A | 6/1993 |
| JP | 5-142338 A | 6/1993 |
| JP | 5-150035 A | 6/1993 |
| JP | 5-249233 A | 9/1993 |
| JP | 10-148669 A | 6/1998 |
| JP | 11-38129 A | 2/1999 |
| JP | 11-271429 A | 10/1999 |
| JP | 11-337635 A | 12/1999 |

OTHER PUBLICATIONS

Skolink, Introduction to Radar Systems, Sec. 3.3, pp. 86–89 (1962).
Skolink, Radar Handbook, Sec. 14.11, pp. 14.27–14.28 (1970).
Takashi, Revision Radar Technology, pp. 274–275 (1996).

* cited by examiner

Primary Examiner—Ian J. Lobo
(74) Attorney, Agent, or Firm—Birch, Stewart, Kolasch & Birch, LLP

(57) ABSTRACT

A distance and speed measuring method and a radar signal processing apparatus using the method are provided which are capable of obtaining highly reliable measurement results while reducing the number of false targets and undetectable targets, by obtaining the relative distance and the relative speed of each target based on the frequencies of a beat signal of up (or down) phase alone through the use of information in a time series direction of the frequencies of the beat signal of up (or down) phase.

9 Claims, 4 Drawing Sheets

DISTANCE/VELOCITY MEASURING METHOD AND RADAR SIGNAL PROCESSING DEVICE

This application is the national phase under 35 U.S.C. §371 of PCT International Application No. PCT/JP01/01264 which has an International filing date of Feb. 21, 2001, which designated the United States of America.

TECHNICAL FIELD

The present invention relates to a signal processing apparatus for a radar installed on a movable object such as, for instance, a vehicle, etc., and more particularly, to a distance and speed measuring method for detecting an object in the form of a target, and measuring the relative distance and relative speed of the object, as well as to a radar signal processing apparatus using such a method.

BACKGROUND ART

In radars installed on vehicles, etc., the distance of a target which is able to be measured thereby is generally in the range of about several m to about 200 m. As a radar system for detecting objects to be measured lying in such a range, there has often been used a well-known FMCW (Frequency Modulated Continuous Wave) method which is described for example in a book entitled "Introduction to Radar Systems" by M. I. SKOLNIK, McGRAW-HILL BOOK COMPANY, INC., (1962), a book entitled "RADAR HANDBOOK" by M. I. SKOLNIK, McGRAW-HILL BOOK COMPANY, INC., (1970), a book entitled "Radar Technologies" compiled under the supervision of Takashi Yoshida and edited by the Japanese Electronic Information Communications Society (1989), etc.

FIG. 3 shows the frequency characteristics of respective signals relative to time in an FMCW radar.

In FIG. 3, 1 designates a transmission signal, 2 a reception signal, and 3 a beat signal. Assuming that a frequency sweep width is B; a frequency sweep time is T; the speed of light is c: a wavelength is $\lambda$; the relative distance to a target is r; and the relative speed of the target is v, the frequency U of the beat signal 3 in the up phase and the frequency D of the beat signal in the down phase are represented by the following expression:

$$U = -\frac{2B}{cT}r + \frac{2}{\lambda}v \quad (1)$$

$$D = \frac{2B}{cT}r + \frac{2}{\lambda}v \quad (2)$$

From these relations, the relative distance r and the relative speed v of the target are obtained from the following expressions (5), (6) by using the results according to the subtraction and addition of the beat frequencies U and D, as shown by the following expressions (3), (4).

$$D - U = \frac{4B}{cT}r \quad (3)$$

$$U + D = \frac{4}{\lambda}v \quad (4)$$

$$r = \frac{cT}{4B}(D - U) \quad (5)$$

$$v = \frac{\lambda}{4}(U + D) \quad (6)$$

Moreover, when there are (N) targets, the frequency Ui{i=Nu, Nu≦N} of the beat signal in the up phase and the frequency Dj{j=Nd, Nd≦N} of the beat signal in the down phase are obtained. Therefore, a frequency pair (Ux, Dy) is selected based on a criterion set beforehand. The relative distance and the relative speed of each target are obtained by substituting the frequency pair for the expressions (5) and (6).

For such a selection criterion, for example, peak strengths in the frequency spectrum of the beat signal may be employed. In Japanese Patent Application Laid-Open No. 5-142337, pairs are determined in order of the magnitude of strength thereof. In addition, in Japanese Patent Application Laid-Open No. 11-337635, there are used strength patterns which are obtained some different directions by scanning a beam.

These relative distance and relative speed of a target are generally measured repeatedly at preset time intervals.

However, in actuality, there arises a problem that the frequency of the beat signal measured in a time series manner is varied according to the state of reflection from a target in the form of a vehicle, the characteristics of the components of a transmit and receive device, etc., thus resulting in unstable measurements of the distance and speed of the vehicle.

As solutions for such a problem, Japanese Patent Application Laid-Open No. 5-142338, Japanese Patent Application Laid-Open No. 5-150035, Japanese Patent Application Laid-Open No. 5-249233, etc., disclose the use of information in a time series direction with respect to the frequency of the beat signal.

For instance, FIG. 4 shows the configuration of a signal processing part of a millimeter wave radar system disclosed in Japanese Patent Application Laid-Open No. 5-249233. The signal processing part 10 illustrated is provided with an A/D (Analog to Digital) conversion part 11, a frequency analysis part 12, a switching part 13, comparison parts 14, 18, reference value forming parts 15, 19, storage parts 16, 20, variation removing parts 17, 21, and a distance and speed deriving part 22.

Next, the operation will be described below. In the signal processing part 10 shown in FIG. 4, a beat signal 3 for a target is input as an analog signal, and this beat signal is converted into a digital signal by the A/D conversion part 11. In the frequency analysis part 12, frequency analysis is performed through the use of an FFT (Fast Fourier Transform), etc., and the frequency U of the beat signal in an up phase and the frequency D of the beat signal in a down phase are extracted.

These frequencies are associated through the switching part 13 with the point in time t at which they are measured. The frequency U is stored as U(t) in the storage part 16, and the frequency D is also stored as D(t) in the storage part 20.

At time point t, the reference value forming part 15 sets a reference value Uref(t) by using the past data stored in the storage part 16. For instance, the reference value Uref(t) is set according to the following expression (7) while assuming that an measurement interval is $\Delta t$.

$$Uref(t) = \frac{U(t-\Delta t) + U(t-2\cdot\Delta t) + \cdots + U(t-5\cdot\Delta t)}{5} \quad (7)$$

Similarly, the reference value forming part 19 sets a reference value Dref(t) by using the past data stored in the storage part 20. For instance, the reference value Dref(t) is set according to the following expression (8).

$$Dref(t) = \frac{D(t-\Delta t) + D(t-2\cdot\Delta t) + \cdots + D(t-5\cdot\Delta t)}{5} \quad (8)$$

The comparison part 14 compares the frequency U(t) of the beat signal in the up phase input thereto via the switching part 13 with the reference value Uref(t) set by the reference value forming part 15, and determines whether the frequency U(t) of the beat signal in the up phase is data without any variation. For instance, whether the relationship of the following expression (9) is satisfied for a preset allowance or allowable width Wu is used as a criterion for such a determination.

$$|U(t) - Uref(t)| \leq Wu \quad (9)$$

Similarly, the comparison part 18 compares the frequency D(t) of the beat signal in the down phase input thereto via the switching part 13 with the reference value Dref(t) set by the reference value forming part 19, and determines whether the frequency D(t) of the beat signal in the down phase is data without any variation. For instance, whether the relationship of the following expression (10) is satisfied for a preset allowance or allowable width Wd.

$$|D(t) - Dref(t)| \leq Wd \quad (10)$$

The frequency U(t) of the beat signal in the up phase, for which the presence or absence of a variation was determined by the comparison part 14, is removed by the variation removing part 17 if determined as including a variation, whereas it is stored in the storage part 16 and input to the distance and speed deriving part 22 if determined as including no variation.

Similarly, the frequency D(t) of the beat signal in the down phase, for which the presence or absence of a variation was determined by the comparison part 18, is removed by the variation removing part 21 if determined as including a variation, whereas it is stored in the storage part 20 and input to the distance and speed deriving part 22 if determined as including no variation.

Here, note that the frequency data U(t−Δt) and D(t−Δt) of the last beat signal may be used instead of the frequencies U(t) and D(t) of the current beat signal when the frequencies of the beat signal having been determined as including a variation are removed by the variation removing part.

The distance and speed deriving part 22 calculates the distance and the speed for the frequencies U(t) and D(t) of the input beat signal according to the expressions (5), (6).

The signal processing part of the known radar system is constructed as mentioned above, and is able to suppress variations in the beat frequencies in the time series direction. However, the prior art techniques including the above examples require a frequency pair of beat frequencies, i.e., a beat frequency in the up phase and a beat frequency in the down phase, in order to obtain the distance and the speed of a target.

Therefore, if one of the frequencies is not obtained, there will be a (non-detection) target undetected due to the fact that no frequency pair is selected even though the target actually exists. On the other hand, an incorrect or wrong frequency pair might be selected by the use of past beat frequencies instead of current beat frequencies not obtained, so that there will appear a target (false target) which can not actually exist. As a result, the reliability of the measurement results is deteriorated by these factors.

The present invention is intended to obviate the above-mentioned problems, and has for its object to provide a distance and speed measuring method and a radar signal processing apparatus using the method, which can obtain reliable measurement results while reducing false targets and undetectable targets by finding the distance and speed of a target based solely on the frequency of a beat signal of up (or down) phase by using information in a time series direction of the frequency of the beat signal of up (or down) phase.

SUMMARY OF INVENTION

In order to achieve the above object, a distance and speed measuring method according to the present invention, in which a relative distance and a relative speed of a target are measured based on a beat signal generated from a transmission signal and a reception signal of a continuous wave radar, which is frequency modulated by a triangular wave, is characterized by including: a present measurement stage in which beat frequencies are extracted from the beat signal in an up phase (modulation frequency increase period) and in a down phase (modulation frequency decrease period), and a frequency pair of beat frequencies corresponding to the target is selected among the extracted frequencies, the relative distance and the relative speed of the target being obtained based on the thus selected frequency pair as observed values, from which a relative distance, a relative speed and a beat frequency of the target are obtained as predicted values at the next observation time; and next and following measurement stages in which relative distances and relative speeds of the target at the next and following observation times are measured by using only beat frequencies in either one of the up phase and the down phase.

In addition, the next and following measurement stages is characterized in that priority is given to processing by beat frequencies in either one of the up phase and the down phase, and processing by beat frequencies in the other phase alone is carried out only when no target is detected in the one phase.

Moreover, the next and following measurement stages is characterized in that the observed values, the predicted values, and smoothed values which are obtained from the observed values and the predicted values are used when relative distances and relative speeds of the target at the next and following observation times are obtained by using only beat frequencies in either one of the up phase and the down phase.

Further, the next and following measurement stages is characterized in that assuming that an estimated distance value, an estimated speed value, an estimated beat frequency value in the up phase, an estimated beat frequency value in the down phase, an observed beat frequency value in the up phase, and an observed beat frequency value in the down phase, at the next observation point in time t+Δt, are Rp(t+Δt), Vp(t+Δt), Up(t+Δt)x, Dp(t+Δt)y, U(t+Δt)x, and D(t+Δt)y, respectively, a smoothed distance value Rs(t+Δt) and a smoothed speed value Vs(t+Δt) are calculated by using the following expression:

$$Rs(t+\Delta t)=Rp(t+\Delta t)+\alpha\times\{Up(t+\Delta t)x-U(t+\Delta t)x\}$$

$$Vs(t+\Delta t)=Vp(t+\Delta t)+\beta\times\{Up(t+\Delta t)x-U(t+\Delta t)x\}$$

$$Rs(t+\Delta t)=Rp(t+\Delta t)+\alpha\times\{Dp(t+\Delta t)y-D(t+\Delta t)y\}$$

$$Vs(t+\Delta t)=Vp(t+\Delta t)+\beta\times\{Dp(t+\Delta t)y-D(t+\Delta t)y\}$$

where $\alpha$ and $\beta$ are constants.

Furthermore, a radar signal processing apparatus according to the present invention, in which a relative distance and a relative speed of a target are measured based on a beat signal generated from a transmission signal and a reception signal of a continuous wave radar, which is frequency modulated by a triangular wave, is characterized by including: frequency analysis means adapted to receive the beat signal in an up phase and in a down phase, respectively, for extracting frequencies of the beat signal; frequency pair selection means for selecting a frequency pair corresponding to the target from the frequencies of the beat signal in the up phase and in the down phase extracted by the frequency analysis means; distance and speed deriving means adapted to receive the frequency pair selected by the frequency selection means for obtaining the relative distance and the relative speed of the target at present; distance and speed prediction means adapted to receive the relative distance and the relative speed of the target at present from the distance and speed deriving means for calculating an predicted distance value and an predicted speed value of the target after a lapse of a prescribed time while assuming the movement of the target; frequency prediction means adapted to receive the predicted distance value and the predicted speed value from the distance and speed prediction means for calculating an predicted frequency value of the beat signal in the up phase or in the down phase; frequency comparison means for making a comparison between the predicted frequency value of the beat signal predicted by the frequency prediction means and the frequency thereof after a lapse of the prescribed time thereby to determine the presence or absence of a beat frequency whose difference in the above comparison result exists in the range of a preset allowable frequency width; and distance and speed smoothing means for calculating a smoothed distance value and a smoothed speed value based on the predicted distance value and the predicted speed value from the distance and speed prediction means, the predicted beat frequency from the frequency prediction means, and an observed frequency value of the beat signal after a lapse of the prescribed time obtained by the frequency analysis means; wherein relative distances and relative speeds of the target at the next and following observation times are obtained by the distance and speed smoothing means through the use of only the beat frequency in either one of the up phase and the down phase obtained by the frequency prediction means.

Still further, the radar signal processing apparatus is characterized in that the frequency prediction means, the frequency comparison means and the distance and speed smoothing means are provided in one set for each of the up phase and the down phase; at the next and following measurement times, priority is given to the processing of the frequency prediction means, the frequency comparison means and the distance and speed smoothing means in either one of the up phase and the down phase, and processing is carried out by the frequency prediction means, the frequency comparison means and the distance and speed smoothing means in the other phase alone when no target is detected in the one phase.

Besides, the distance and speed smoothing means is characterized in that assuming that an estimated distance value, an estimated speed value, an estimated beat frequency value in the up phase, an estimated beat frequency value in the down phase, an observed beat frequency value in the up phase, and an observed beat frequency value in the down phase, at the next observation point in time t+Δt, are Rp(t+Δt), Vp(t+Δt), Up(t+Δt)X, Dp(t+Δt)y, U(t+Δt)x, and D(t+Δt)y, respectively, a smoothed distance value Rs(t+Δt) and a smoothed speed value Vs(t+Δt) are calculated by using the following expression:

$$Rs(t+\Delta t)=Rp(t+\Delta t)+\alpha\times\{Up(t+\Delta t)x-U(t+\Delta t)x\}$$

$$Vs(t+\Delta t)=Vp(t+\Delta t)+\beta\times\{Up(t+\Delta t)x-U(t+\Delta t)x\}$$

$$Rs(t+\Delta t)=Rp(t+\Delta t)+\alpha\times\{Dp(t+\Delta t)y-D(t+\Delta t)y\}$$

$$Vs(t+\Delta t)=Vp(t+\Delta t)+\beta\times\{Dp(t+\Delta t)y-D(t+\Delta t)y\}$$

where $\alpha$ and $\beta$ are constants.

BEST MODE FOR CARRYING OUT THE INVENTION

Hereinafter, preferred embodiments of the present invention will be described in detail while referring to the accompanying drawing.

Figure 1:
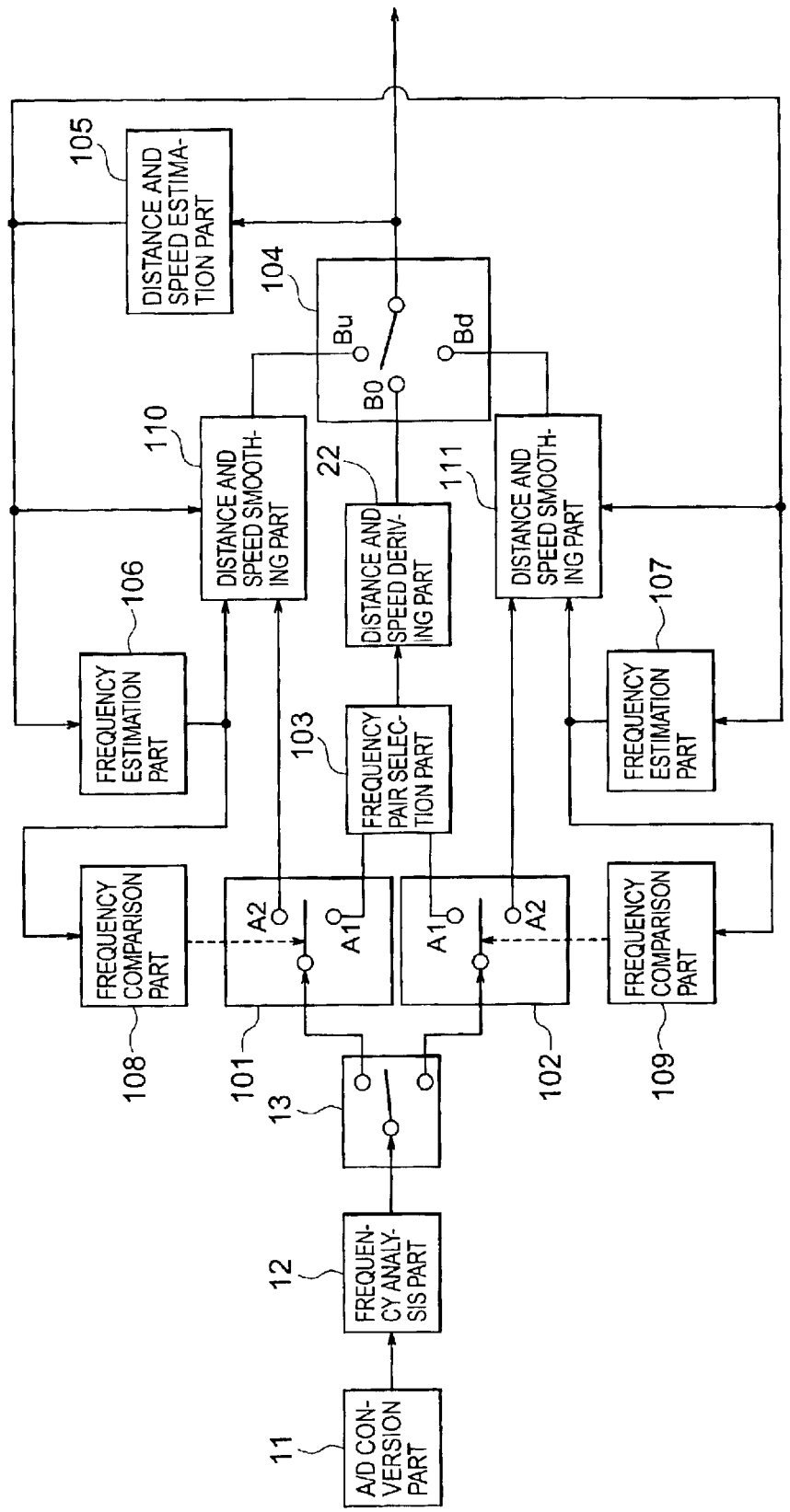
FIG. 1 is a constructional view of a radar signal processing apparatus according to an embodiment of the present invention.
Figure 4:
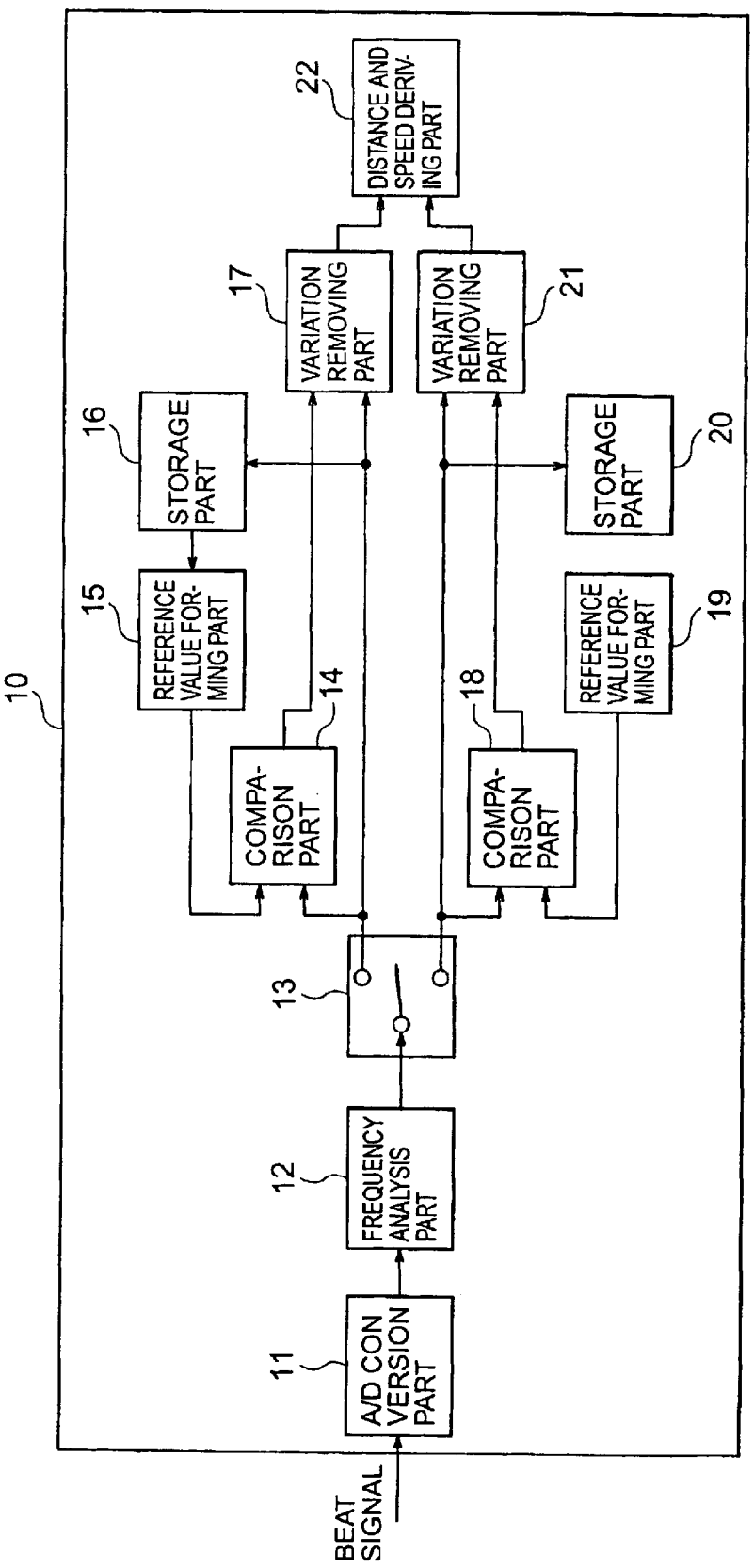
FIG. 4 is a view illustrating the configuration of a signal processing part of a millimeter wave radar system disclosed in Japanese Patent Application Laid-Open No. 5-249233.

FIG. 1 is a constructional view which shows a radar signal processing apparatus according to an embodiment of the present invention. In FIG. 1, the same parts as those of the known example illustrated in FIG. 4 are identified by the same symbols while omitting an explanation thereof. New symbols 101, 102 and 104 designate switching parts, respectively. 103 designates a frequency pair selection part for selecting a frequency pair corresponding to a target from the frequencies of a beat signal in an up phase and in a down phase extracted by a frequency analysis part 12. 105 designates a distance and speed prediction part which receives the current relative distance and relative speed of the target from the distance and speed deriving part 22 and calculates an predicted distance value and an predicted speed value after a lapse of a prescribed time while assuming or estimating the movement of the target.

Moreover, 106 and 107 designate frequency prediction parts which receive the predicted distance value and the predicted speed value from the distance and speed prediction part 105, and calculate predicted values of frequencies of the beat signal in the up phase and the down phase, respectively. 108 and 109 designate frequency comparison parts which compare the predicted values of frequencies of the beat signal predicted by the frequency prediction parts 106, 107 with the frequencies of the beat signal after a lapse of a prescribed time, respectively, and determines the presence or absence of a beat frequency whose difference in the comparison results exists in the range of a preset allowable frequency width. 110 and 111 designate distance and speed smoothing parts which calculate smoothed values of the distance and the speed based on the predicted values of the distance and the speed from the distance and speed prediction parts 106, 107 and the observed values of the frequencies of the beat signal from the frequency prediction means.

Figure 2:
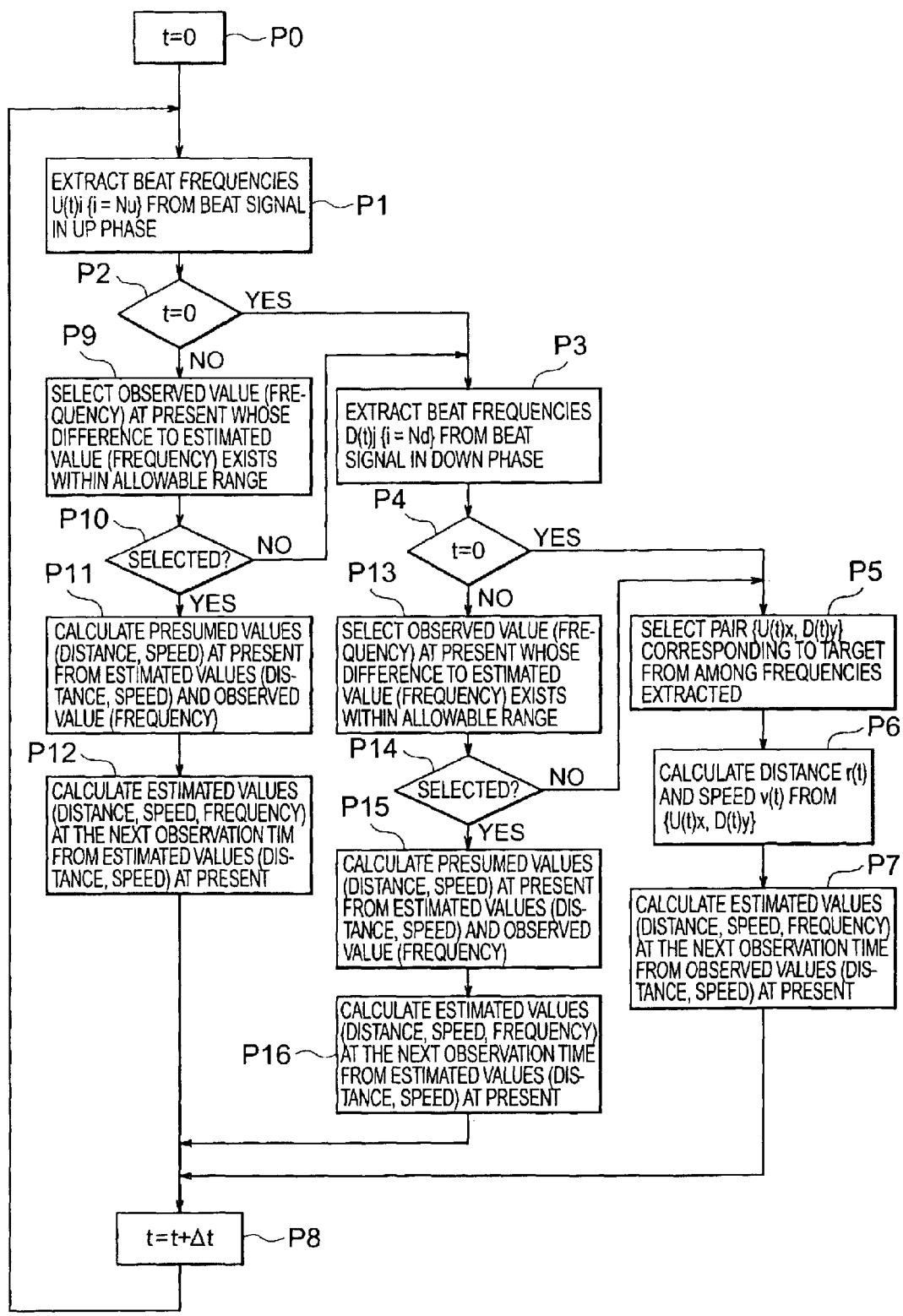
FIG. 2 is a flow chart illustrating a processing procedure for measuring the relative distance and the relative speed of a target in the radar signal processing apparatus of FIG. 1.
Figure 3:
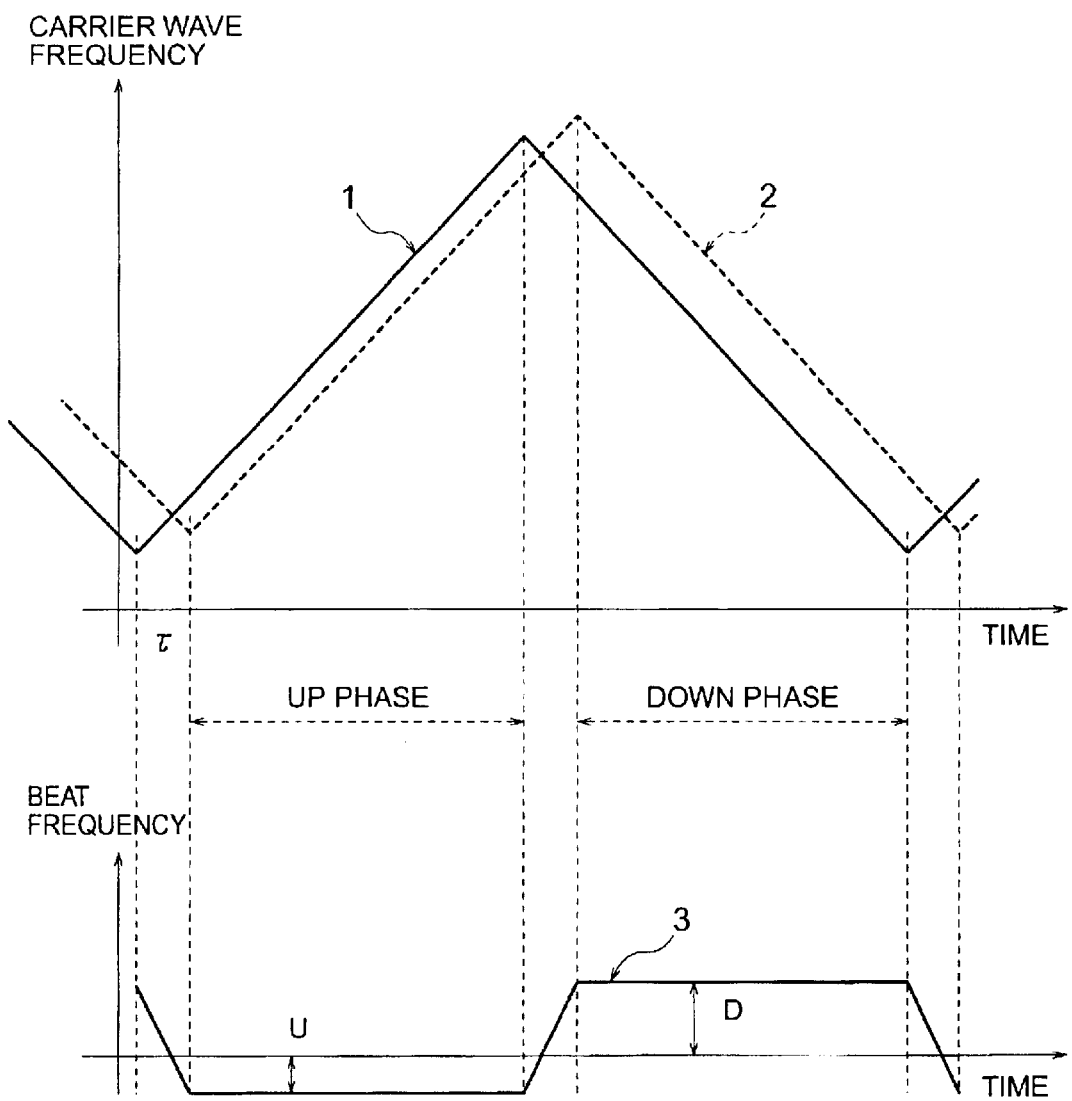
FIG. 3 is a view illustrating the frequency characteristics of respective signals relative to time in an FMCW radar.

In addition, FIG. 2 is a flow chart which shows a processing procedure for measuring the relative distance and the relative speed of a target in the radar signal processing apparatus shown in FIG. 1.

Now, reference will be made to the operation of the radar signal processing apparatus shown in FIG. 1 for measuring the relative distance and the relative speed of the target in accordance with the procedure of the flow chart shown in FIG. 2.

The point in time at which a measurement operation is started corresponds to step P0, and the time t inside the signal processing apparatus is set to 0. At this time, the switching part 101 and the switching part 102 are both connected to an A1 terminal, and the switching part 104 is connected to a B0 terminal.

In step P1, the frequency analysis part 12 receives a beat signal in the up phase, which was converted into an digital signal by the A/D conversion part 11, and extracts a frequency U(t)i of the beat signal through a frequency analysis using an FFT for instance. The frequency U(t)i of the beat signal is input to the frequency pair selection part 103 via the switching part 13 and the switching part 101.

In step P2, if it is determined as t=0 by referring to the present point in time t, the flow proceeds to step P3, whereas if it is determined as t≠0, the flow proceeds to step P9. Here, first assuming that t=0, the flow proceeds to step P3.

In step P3, the frequency analysis part 12 receives a beat signal in the down phase, which was converted into a digital signal by the A/D conversion part 11, and extracts a frequency D(t)j of the beat signal through a frequency analysis using an FFT for instance.

The frequency D(t)j of the beat signal is input to the frequency pair selection part 103 via the switching part 13 and the switching part 101.

In step P4, if it is determined as t=0 by referring to the present point in time t, the flow proceeds to step P5, whereas if it is determined as t≠0, the flow proceeds to step P13. Here, first assuming that t=0, the flow proceeds to step P5.

In step P5, the frequency pair selection part 103 selects a frequency pair {U(t)x, D(t)y} corresponding to a target from the frequencies U(t)i and D(t)j of the input beat signal.

In step P6, the distance and speed deriving part 22 receives the frequency pair {U(t)x, D(t)y}, and calculates, according to the expressions (5) and (6) described above, a relative distance r(t) and a relative speed v(t) of the target at the present point in time, which are output as measurement results through the switching part 104.

In step P7, the distance and speed prediction part 105 receives the relative distance r(t) and the relative speed v(t) of the target at the present point in time, and calculates an predicted distance value Rp(t+Δt) and an predicted speed value Vp(t+Δt) in the next observation point in time t+Δt, while assuming or estimating the movement of the target. For instance, when it is assumed that the target performs uniform motion, the above calculations are carried out according to the following expressions (11) and (12).

$$Rp(t+\Delta t)=r(t)+\Delta t \times v(t) \quad (11)$$

$$Vp(t+\Delta t)=v(t) \quad (12)$$

In addition, the frequency prediction part 106 receives the predicted distance value Rp(t+Δt) and the predicted speed value Vp(t+Δt), and calculates an predicted value Up(t+Δt)x of the frequency of the beat signal in the up phase from the expression (1). Also, the frequency prediction part 107 receives the predicted distance value Rp(t+Δt) and the predicted speed value Vp(t+Δt), and calculates an predicted value Dp(t+Δt)x of the frequency of the beat signal in the down phase from the expression (2).

In step P8, Δt is added to the time t inside the signal processing apparatus, a return is made to step P1 so as to perform the measurement at time t+Δt.

In step P1, a beat frequency U(t+Δt)i is extracted in the same manner as described above.

In step P2, assuming that t≠0, the flow proceeds to step P9.

In step P9, the frequency comparison part 108 makes a determination as to the presence or absence of a beat frequency U(t+Δt)i satisfying the following expression (13) based on a preset allowable frequency width Fu. That is, it is determined whether a target can be detected in the up phase.

$$|Up(t+\Delta t)x-U(t+\Delta t)i| \leq Fu \quad (13)$$

In step P10, if there is a beat frequency U(t+Δt)i satisfying the above condition, it is set as U(t+Δt)x and the flow proceeds to step P11, whereas if there is no such a beat frequency, the flow proceeds to step P3. Here, first assuming that there is a U(t+Δt)x satisfying the above condition, the flow proceeds to step P11.

In step P11, the distance and speed smoothing part 110 calculates a smoothed distance value Rs(t+Δt) and a smoothed speed value Vs(t+Δt) from the predicted values Rp(t+Δt), Vp(t+Δt), Up(t+Δt)x and the observed value U(t+Δt)x according to the following expressions (14) and (15).

$$Rs(t+\Delta t)=Rp(t+\Delta t)+\alpha \times \{Up(t+\Delta t)x-U(t+\Delta t)x\} \quad (14)$$

$$Vs(t+\Delta t)=Vp(t+\Delta t)+\beta \times \{Up(t+\Delta t)x-U(t+\Delta t)x\} \quad (15)$$

At this time, the switching part 104 is connected to a Bu terminal, from which the smoothed distance value Rs(t+Δt) and the smoothed speed values Vs(t+Δt) as calculated through the expressions (14) and (15) are output as the measurement results. That is, the distance and the speed of the target are obtained only by the beat frequency of the up phase.

In step P12, the distance and speed prediction part 105 receives the smoothed distance value Rs(t+Δt) and the smoothed speed value Vs(t+Δt) thus calculated by the expressions (14) and (15) as the distance and the speed at present as in step P7, and calculates an predicted distance value Rp(t+2Δt) and an predicted speed value Vp(t+2Δt) at the next observation point in time t+2Δt, while assuming the movement of the target.

Further, the frequency estimation part 106 receives the estimated distance value Rp(t+2Δt) and the estimated speed value Vp(t+2Δt), and calculates an estimated value Up(t+2Δt)x of the beat frequency in the up phase from the expression (1). Also, the frequency estimation part 107 receives the estimated values Rp(t+Δt) and Vp(t+Δt), and calculates an estimated value Dp(t+2Δt)y of the beat frequency in the down phase from the expression (2).

In step P8, Δt is added to the time t inside the signal processing apparatus, and in order to perform the measurement at time point t+2Δt, a return to step P1 is performed and the above-mentioned operations are carried out.

Next, reference will be made to the case where when there is no U(t+Δt)x in step P10, that is, when no target is detected, the flow proceeds to step P3. In step P3, D(t+Δt)j is extracted in the same manner as described above.

In step P4, assuming that t≠0, the flow proceeds to step P13.

In step P13, the frequency comparison part 109 determines the presence or absence of D(t+Δt)j satisfying the following expression (16) based on a preset allowable frequency width Fd.

$$|Dp(t+\Delta t)y - D(t+\Delta t)j| \leq Fd \qquad (16)$$

If there is no D(t+Δt)j in step P14, the flow proceeds to step P5 and the above-mentioned operation is carried out.

On the other hand, if there is a D(t+Δt)j, it is set as D(t+Δt)y and the flow proceeds to step P15.

In step P15, the distance and speed smoothing part 111 calculates a smoothed distance value Rs(t+Δt) and a smoothed speed value Vs(t+Δt) from the predicted values Rp(t+Δt), Vp(t+Δt) and Dp(t+Δt) y, and the observed value D(t+Δt)y according to the following expressions, as in step P11.

$$Rs(t+\Delta t) = Rp(t+\Delta t) + \alpha \times \{Dp(t+\Delta t)y - D(t+\Delta t)y\} \qquad (17)$$

$$Vs(t+\Delta t) = Vp(t+\Delta t) + \beta \times \{Dp(t+\Delta t)y - D(t+\Delta t)y\} \qquad (18)$$

At this time, the switching part 104 is connected to a Bd terminal, from which the smoothed distance value Rs(t+Δt) and the smoothed speed values Vs(t+Δt) as calculated by the expressions (17) and (18) are output as measurement results. That is, the distance and the speed of the target are obtained only by the beat frequency of the down phase.

In step P16, the distance and speed prediction part 105 receives the smoothed distance value Rs(t+Δt) and the smoothed speed value Vs(t+Δt) thus calculated by the expressions (17), (18) as the distance and the speed at present, as in step P12, and calculates an predicted distance value Rp(t+2Δt) and an predicted speed value Vp(t+2Δt) at the next observation point in time t+2Δt, while assuming the movement of the target.

In addition, the frequency estimation part 106 receives Rp(t+2Δt) and Vp(t+2Δt), and calculates an estimated value Up(t+2Δt)x of the beat frequency in the up phase from the expression (1). Also, the frequency estimation part 107 receives Rp(t+Δt) and Vp(t+Δt), and calculates an estimated value Dp(t+2Δt)y of the beat frequency in the down phase from the expression (2).

In step P8, Δt is added to the time t inside the signal processing apparatus, and in order to perform the measurement at time point t+2Δt, the flow returns to step P1, thus repeating the above-mentioned operations.

Here, note that the individual components of FIG. 1 may be achieved by dedicated operational circuits, respectively. Alternatively, they may be implemented by a program built into a CPU (Central Processing Unit) or a DSP (Digital Signal Processor).

Moreover, in FIG. 2, the steps from P0 to P7 constitute a present measurement stage, and the steps P8→P1→P2→P9–P12 constitute the next and following measurement stages in which the relative distances and the relative speeds of the target at the next and following observation points in time can be measured by using only beat frequencies in the up phase. However, only beat frequencies in the down phase may be used in place of those in the up phase. In the case of the measurement stages constructed such that measurements are carried out by using only beat frequencies in the down phase, the steps P3→P4→P13—P16 may be replaced by a measurement stage where only beat frequencies in the up phase are used.

Thus, according to the above-mentioned embodiment, the relative distance and the relative speed of a target can be obtained only by frequencies in one phase, so it is possible to obtain measurement results with high reliability by decreasing undetectable targets and false targets.

Moreover, one measurement processing according to frequencies in one phase alone is performed preferentially, and only when no target has been detected by this measurement processing, another measurement processing according to frequencies in the other phase is then carried out, whereby it is possible to obtain measurement results with high reliability by decreasing the number of undetectable targets.

Moreover, observed values, predicted values and smoothed values are used in the measurement processing according to frequencies in one phase alone, so that false targets can be reduced, thereby making it possible to provide measurement results with high reliability.

In addition, the use of expressions (14), (15), (17) and (18) in the measurement processing according to frequencies in one phase alone makes it possible to provide accurate measurement results.

INDUSTRIAL APPLICABILITY

As described above, according to the present invention, by obtaining the relative distance and the relative speed of a target based on the frequencies of a beat signal of up (or down) phase alone through the use of information in a time series direction of the frequencies of the beat signal of up (or down) phase, it is possible to provide a distance and speed measuring method and a radar signal processing apparatus using the method, which are capable of obtaining highly reliable measurement results while reducing the number of false targets and undetectable targets.

What is claimed is:

1. A distance and speed measuring method in which a relative distance and a relative speed of a target are measured based on a beat signal comprising a transmission signal and a reception signal of a continuous wave radar, which is frequency modulated by a triangular wave, said method being characterized by comprising:

a present measurement stage in which beat frequencies are extracted from the beat signal in an up phase (modulation frequency rise period) and in a down phase (modulation frequency fall period), and a frequency pair of beat frequencies corresponding to the target is selected among the extracted frequencies, the relative distance and the relative speed of the target being obtained based on the thus selected frequency pair as observed values, from which a relative distance, a relative speed and a beat frequency of the target are obtained as estimated values at the next observation time; and next and following measurement stages in which relative distances and relative speeds of the target at the next and following observation times are measured by using only beat frequencies in either one of the up phase and the down phase.

2. The distance and speed measuring method according to claim 1, characterized in that in said next and following measurement stages, priority is given to processing by beat frequencies in either one of the up phase and the down phase, and processing by beat frequencies in the other phase alone is carried out only when no target is detected in said one phase.

3. The distance and speed measuring method according to claim 2, characterized in that when relative distances and relative speeds of the target at the next and following observation times are obtained by using only beat frequencies in either one of the up phase and the down phase, said next and following measurement stages use the observed values, the estimated values, and smoothed values which are obtained from the observed values and the estimated values.

4. A distance and speed measuring method in which a relative distance and a relative speed of a target are measured based on a beat signal comprising a transmission signal and a reception signal of a continuous wave radar, which is frequency modulated by a triangular wave, said method being characterized by comprising:

a present measurement stage in which beat frequencies are extracted from the beat signal in an up phase (modulation frequency rise period) and in a down phase (modulation frequency fall period), and a frequency pair of beat frequencies corresponding to the target is selected among the extracted frequencies, the relative distance and the relative speed of the target being obtained based on the thus selected frequency pair as observed values, from which a relative distance, a relative speed and a beat frequency of the target are obtained as estimated values at the next observation time; and next and following measurement stages in which relative distances and relative speeds of the target at the next and following observation times are measured by using only beat frequencies in either one of the up phase and the down phase;

characterized in that in said next and following measurement stages, priority is given to processing by beat frequencies in either one of the up phase and the down phase, and processing by beat frequencies in the other phase alone is carried out only when no target is detected in said one phase;

characterized in that when relative distances and relative speeds of the target at the next and following observation times are obtained by using only beat frequencies in either one of the up phase and the down phase, said next and following measurement stages use the observed values, the estimated values, and smoothed values which are obtained from the observed values and the estimated values;

characterized in that assuming that an estimated distance value, an estimated speed value, an estimated beat frequency value in the up phase, an estimated beat frequency value in the down phase, an observed beat frequency value in the up phase, and an observed beat frequency value in the down phase, at the next observation point in time $t+\Delta t$, are $Rp(t+\Delta t)$, $Vp(t+\Delta t)$, $Up(t+\Delta t)x$, $Dp(t+\Delta t)y$, $U(t+\Delta t)x$, and $D(t+\Delta t)y$, respectively, said next and following measurement stages (P8, P1, P2, P9–P12) calculate a smoothed distance value $Rs(t+\Delta t)$ and a smoothed speed value $Vs(t+\Delta t)$ by using the following expression:

$$Rs(t+\Delta t)=Rp(t+\Delta t)+\alpha\times\{Up(t+\Delta t)x-U(t+\Delta t)x\}$$

$$Vs(t+\Delta t)=Vp(t+\Delta t)+\beta\times\{Up(t+\Delta t)x-U(t+\Delta t)x\}$$

$$Rs(t+\Delta t)=Rp(t+\Delta t)+\alpha\times\{Dp(t+\Delta t)y-D(t+\Delta t)y\}$$

$$Vs(t+\Delta t)=Vp(t+\Delta t)+\beta\times\{Dp(t+\Delta t)y-D(t+\Delta t)y\}$$

where $\alpha$ and $\beta$ are constants.

5. A radar signal processing apparatus in which a relative distance and a relative speed of a target are measured based on a beat signal comprising a transmission signal and a reception signal of a continuous wave radar, which is frequency modulated by a triangular wave, said apparatus being characterized by comprising:

frequency analysis means (11) adapted to receive the beat signal in an up phase and in a down phase, respectively, for extracting frequencies of the beat signal;

frequency pair selection means (103) for selecting a frequency pair corresponding to the target from the frequencies of the beat signal in the up phase and in the down phase extracted by said frequency analysis means (12);

distance and speed deriving means (22) adapted to receive the frequency pair selected by said frequency pair selection means (103) for obtaining the relative distance and the relative speed of the target at present;

distance and speed estimation means (105) adapted to receive the relative distance and the relative speed of the target at present from said distance and speed deriving means (22) for calculating an estimated distance value and an estimated speed value of the target after a lapse of a prescribed time while assuming the movement of the target;

frequency estimation means (106, 107) adapted to receive the estimated distance value and the estimated speed value from said distance and speed estimation means (105) for calculating an estimated frequency value of the beat signal in the up phase or in the down phase;

frequency comparison means (108, 109) for making a comparison between the estimated frequency value of the beat signal estimated by said frequency estimation means (106, 107) and the frequency thereof after a lapse of the prescribed time thereby to determine the presence or absence of a beat frequency whose difference in the above comparison result exists in the range of a preset allowable frequency width; and distance and speed smoothing means (110, 111) for calculating a smoothed distance value and a smoothed speed value based on the estimated distance value and the estimated speed value from said distance and speed estimation means (105), the estimated beat frequency from said frequency estimation means (106, 107), and an observed frequency value of the beat signal after a lapse of the prescribed time obtained by said frequency analysis means (12);

wherein relative distances and relative speeds of the target at the next and following observation times are obtained by said distance and speed smoothing means (110, 111) through the use of only the beat frequency in either one of the up phase and the down phase obtained by said frequency estimation means (106, 107).

6. The radar signal processing apparatus according to claim 5, characterized in that said frequency estimation means (106, 107), said frequency comparison means (108, 109) and said distance and speed smoothing means (110, 111) are provided in one set for each of the up phase and the down phase; at said next and following measurement times, priority is given to the processing of said frequency estimation means (106, 107), said frequency comparison means (108, 109) and said distance and speed smoothing means (110, 111) in either one of the up phase and the down phase, and processing is carried out by said frequency estimation means (106, 107), said frequency comparison means (108, 109) and said distance and speed smoothing means (110, 111) in the other phase alone when no target is detected in said one phase.

7. The radar signal processing apparatus according to claim 5, characterized in that assuming that an estimated distance value, an estimated speed value, an estimated beat frequency value in the up phase, an estimated beat frequency value in the down phase, an observed beat frequency value in the up phase, and an observed beat frequency value in the down phase, at the next observation point in time t+Δt, are Rp(t+Δt), Vp(t+Δt), Up(t+Δt)x, Dp(t+Δt)y, U(t+Δt)x, and D(t+Δt)y, respectively, said distance and speed smoothing means (110, 111) calculates a smoothed distance value Rs(t+Δt) and a smoothed speed value Vs(t+Δt) by using the following expression:

$$Rs(t+\Delta t)=Rp(t+\Delta t)+\alpha \times \{Up(t+\Delta t)x-U(t+\Delta t)x\}$$

$$Vs(t+\Delta t)=Vp(t+\Delta t)+\beta \times \{Up(t+\Delta t)x-U(t+\Delta t)x\}$$

$$Rs(t+\Delta t)=Rp(t+\Delta t)+\alpha \times \{Dp(t+\Delta t)y-D(t+\Delta t)y\}$$

$$Vs(t+\Delta t)=Vp(t+\Delta t)+\beta \times \{Dp(t+\Delta t)y-D(t+\Delta t)y\}$$

where α and β are constants.

8. A method for measuring the speed and distance of a target using a radar system, comprising:

measuring frequencies, during a time period, of a beat signal for a frequency increase period and a frequency decrease period corresponding to a target;

deriving speed and distance values for the target, during said time period, based on said frequencies;

determining estimated speed and distance values for the target for a succeeding time period based on said determined speed and distance values;

determining estimated frequencies, during the succeeding time period, of the beat signal for the frequency increase period and the frequency decrease period corresponding to the target based on said estimated speed and distance values; and determining speed and distance values for the target, during said succeeding time period, using said estimated frequency for the frequency increase period or said estimated frequency for the frequency decrease period.

9. The method of claim 8, wherein said determining speed and distance values for the target being based on one of said estimated frequencies satisfying a predetermined threshold.

* * * * *

UNITED STATES PATENT AND TRADEMARK OFFICE
CERTIFICATE OF CORRECTION

PATENT NO. : 6,788,247 B2
DATED : September 7, 2004
INVENTOR(S) : Mitsumoto et al.

It is certified that error appears in the above-identified patent and that said Letters Patent is hereby corrected as shown below:

Title page,
Item [86], please change "PCT/JP01/01364" to -- PCT/JP01/01264 --.

Signed and Sealed this

Thirtieth Day of November, 2004

JON W. DUDAS
*Director of the United States Patent and Trademark Office*